United States Patent [19]

Francis

[11] 4,036,512
[45] July 19, 1977

[54] PIPE JOINTS

[76] Inventor: Robert Arthur Francis, 28 Skyline Drive, Keilor, Victoria, Australia

[21] Appl. No.: 619,972

[22] Filed: Sept. 30, 1975

[30] Foreign Application Priority Data

Oct. 1, 1974 Australia .............................. 9113/74

[51] Int. Cl.² ............................................. F16L 17/00
[52] U.S. Cl. .................................... 285/111; 285/359; 285/369
[58] Field of Search ............... 285/110, 111, 112, 230, 285/231, 401, 354, 395, 369, 232, 349, 359

[56] References Cited
U.S. PATENT DOCUMENTS 1,474,586 11/1923 Hanrahan ........................ 285/401 X
1,899,695 2/1933 Johnson .......................... 285/111 X
3,517,951 6/1970 Dunmire ......................... 285/231 X

FOREIGN PATENT DOCUMENTS 679,052 9/1966 Belgium ............................... 285/111
1,025,687 3/1958 Germany ............................. 285/112

Primary Examiner—Dave W. Arola
Attorney, Agent, or Firm—Donald D. Jeffery

[57] ABSTRACT

This invention relates to a pipe joint for the butt jointing of pipes in the form of a sleeve to receive the respective pipe ends and provide a resilient seal between the sleeve and the pipe surfaces, said seal having peripheral lips adapted to effect an increase in sealing engagement by fluid pressure in the pipes.

1 Claim, 4 Drawing Figures

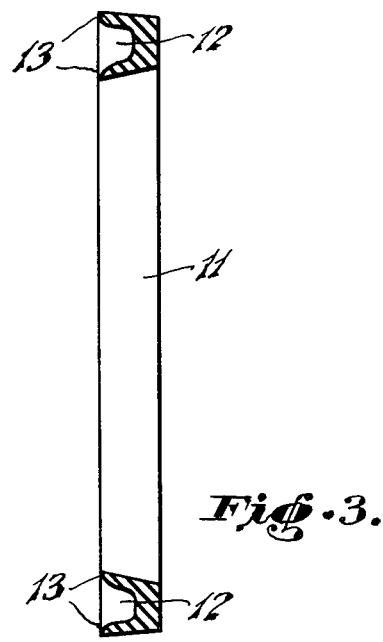
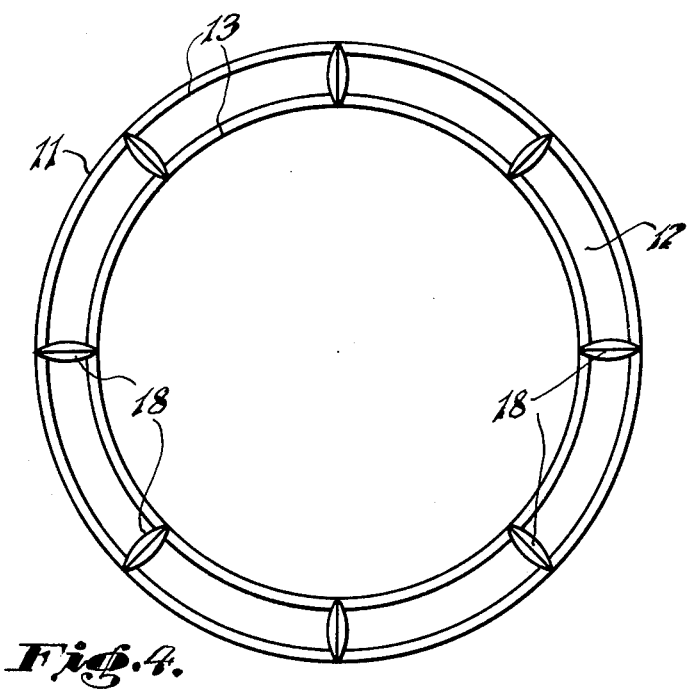

PIPE JOINTS

This invention relates to pipe joints, more particularly though not specifically to butt jointing of PVC, polythene and like plastic piping.

It is generally known that when two pipes are to be jointed with the end of one pipe abutted to the end of the other pipe, the said ends of the pipe are joined by conventional joints which normally consist of a sleeve and flange bolted onto either end of the sleeve compressing a seal between and onto the pipe. Pipe joints of this kind involve considerable problems.

For underground pipelines the conventional joint has electrolytic and corrosion problems associated with the bolts and normally requires to be protective wrapped to reduce this.

The conventional joint is laborious to install as each bolt needs separate tightening and are quite often not correctly installed due to the uneven tensioning of the bolts.

The conventional joint is more expensive to install due to the labour and mechanical aid required to enlarge the working area in the trench around the joint to permit assembly and tensioning of the bolts.

The conventional joint after and during installation on plastics pipes, due to the method of sealing causes compression set of the pipe reducing or eliminating the compression of the seal onto the pipe thus permitting the seal to leak.

The conventional joint normally requires the compression or wedging of a seal onto the pipe to form a seal.

The principal object of the present invention to provide a pipe joint for butt jointing of pipes which avoids the above disadvantages, is simple to install, incorporates an effective seal, will allow limited deflection of the pipes and eliminates compression set of plastic piping.

According to the present invention, a pipe joint for butt jointing of pipes, comprises a sleeve adapted to receive and embrace the respective ends of pipes to be joined, a plurality of spaced apart radially projecting lugs at each end of the sleeve, apertured closures for each end of the sleeve, said closures having channeled flanges to engage the lugs on the sleeve to form a bayonet type connection, internal flanges within the sleeve to form guides for the entry of pipe ends and with the closures form annular recesses about the pipe ends for the reception of resilient sealing rings, and with said sealing rings being grooved to form peripheral lips on their inwardly directed faces so that together with pressure applied by the closures and fluid pressure in the pipes exert sealing pressure on the lips which respectively engage the adjacent inner surface of the sleeve and the adjacent outer surface of the respective pipes.

The grooves in the resilient seal are preferably provided with spaced radial webs adapted to ensure engagement of the seal lips with the sleeve and pipe under all operating conditions particularly if the pipes are angularly deflected.

In order that the invention may be readily understood reference will be made to the accompanying drawings illustrating a practical embodiment of the invention. In these drawings:-

FIG. 3 is a sectional elevation of a sealing ring, and

FIG. 4 is an elevation thereof.

Figure 1:
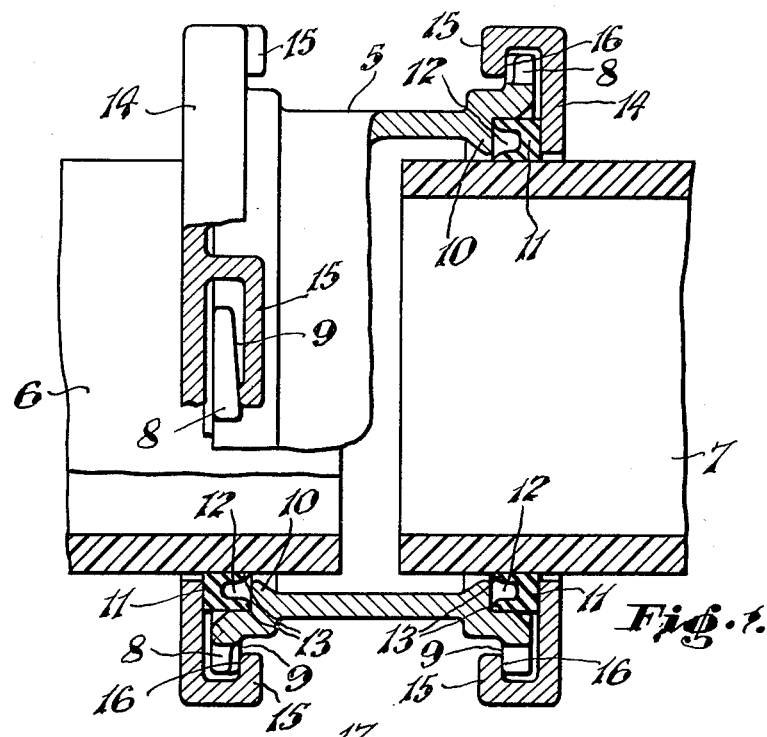
FIG. 1 is a side elevation, partly in section of a pipe joint constructed in accordance with the invention.
Figure 2:
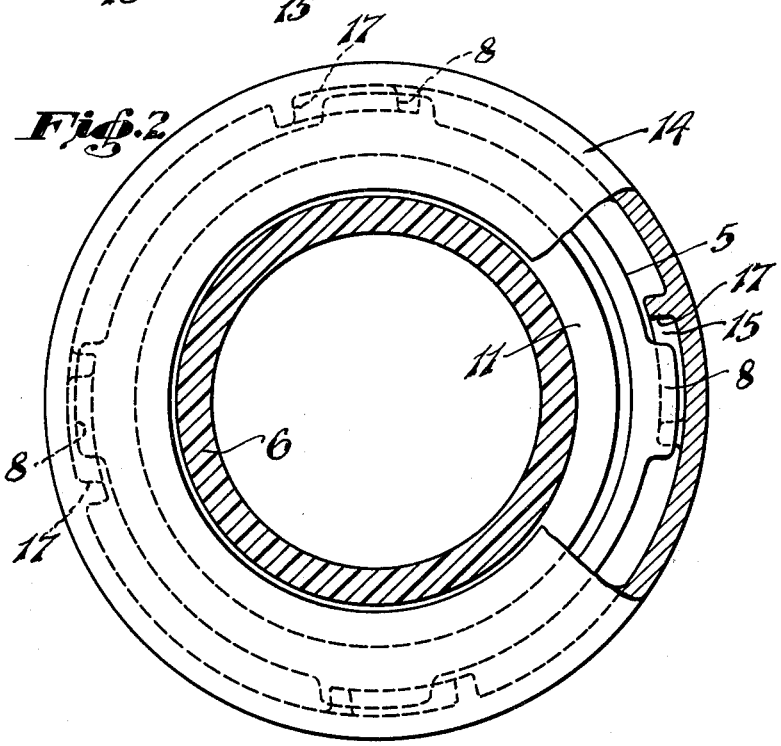
FIG. 2 is an end view thereof.

As illustrated a pipe joint comprises a sleeve 5 adapted to receive the ends of respective pipes 6 and 7 to be butt joined, said sleeve having at the ends thereof a plurality of radially projecting lugs 8 formed with inner inclined wedging surfaces 9 (FIG. 1). On the inner surface of the sleeve 5, adjacent each end of the sleeve is an integral flange 10 which acts as a guide for the insertion of a pipe end into each end of the sleeve and forms with the sleeve an annular recess around the respective pipe end.

Into each said annular recess, a circular resilient sealing ring 11 of rubber or like plastic material is inserted. Each sealing ring 11 is substantially rectangular in cross-section and on one face is formed with a V-groove 12 so that peripheral lips 13 are formed on the edges of that face of the sealing ring. Each ring 11 is inserted into the ends of the sleeve 5 with the lips 13 directed inwardly towards the flanges 10.

Closure rings 14 are provided for each end of the sleeve 5, said rings having projecting radial channeled flanges 15 corresponding to the number of lugs 8 on the sleeve, and arranged so that the inner face 16 of the channeled flanges engage one of the inclined wedging faces 9 of one of the lugs 8 on the sleeve. Stops 17 are included in the channeled flanges to determine full engagement of the flanges 15 with lugs 8.

The closure rings 14 locate and secure the sealing rings 11 in position so that the inwardly facing lips 13 on the sealing rings respectively engage the inner face of the sleeve 5, flange 10 and the other surface of the pipe 6 or 7.

The groove 12 in each sealing ring may be provided with spaced and radially arranged webs 18 which reinforce the lips 13 and ensure engagement of the lips with the surface with which it is required to maintain sealing engagement at low internal fluid pressure in the pipes and particularly if the pipes are angularly inclined or deflected within the limits defined by the flanges 10 in the sleeve and the apertures in the closure rings 14. The seals 11 only provide sufficient expansion to form a seal between the pipes and the sleeve and the principal pressure or compression applied to the pipe ends is the fluid pressure in the pipes against the lip seal surface area which is less than the internal pressure area thereby eliminating compression set on plastic pipes.

What is claimed is:

1. A pipe joint for butt jointing of pipes comprising a sleeve adapted to receive and embrace the respective ends of pipes to be joined, a plurality of spaced apart radially projecting lugs at each end of the sleeve, said lugs having inner inclined wedging faces, and apertured closure for each end of said sleeve, spaced apart channeled flanges on said closures to engage the lugs on the sleeve to provide a bayonet type connection, said flanges being formed with stops to determine full engagement of said flanges with said lugs and being further formed with inner faces which are engaged by the wedging faces of said lugs; flanges integrally formed with said sleeve adjacent each end thereof and extending radially inwardly to form annular guides for said pipes, said flanges and the radially inner portions of said closures which are longitudinally spaced therefrom forming annular recesses about the pipe ends, resilient generally V-shaped sealing rings mounted in said annular recesses, each of said sealing rings comprising an annular groove defined by generally flat, inwardly directed peripheral lips and being formed with circumferentially spaced and radially arranged reinforcing webs, the inner surface of the outer flange of each closure bearing directly against the outer face of each respective sealing ring to press the sealing ring into said annular recess and effect initial sealing engagement of the peripheral lips with the sleeve and respective pipes, with the fluid pressure in the pipes resulting in continued sealing pressure being exerted on said peripheral lips to respectively sealingly engage the same with the adjacent inner surface of the sleeve and the adjacent outer surface of the respective pipes.

* * * * *